Patented Aug. 8, 1950

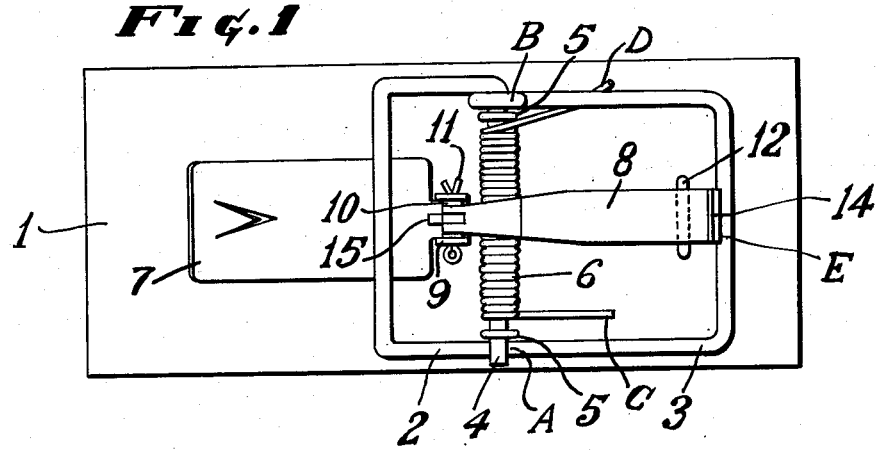
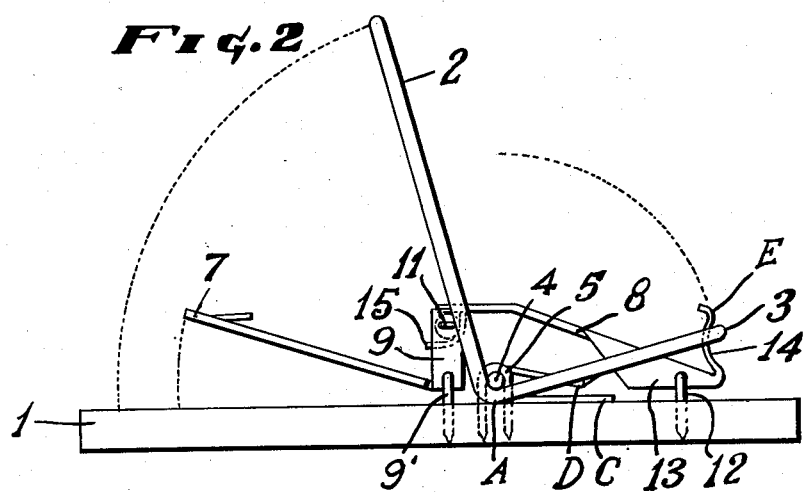
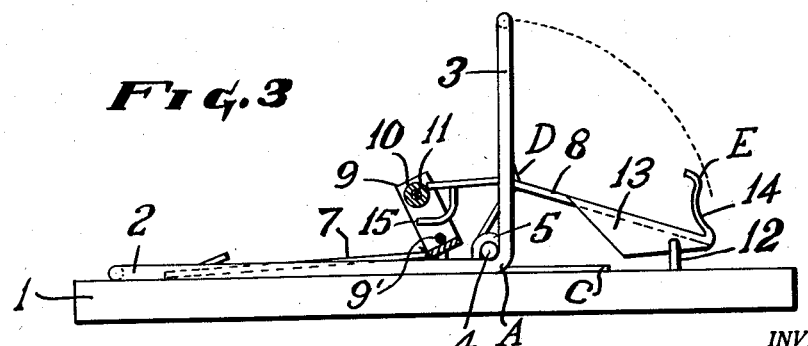
INVENTOR.
LEWIS I. RICHARDS.

2,517,928

UNITED STATES PATENT OFFICE 2,517,928

ANIMAL TRAP

Lewis I. Richards, Augusta, Kans.

Application August 4, 1947, Serial No. 765,887

1 Claim. (Cl. 43—81)

This invention relates to an animal trap particularly for capturing rats and mice, and has for its principal object improvements in its trigger mechanism for retaining the trap set that requires a slight pressure downward on its bait plate to release the trap and thus making the same very effective for catching animals such as rats and mice.

An other object of this invention is to provide a trap having a safety means to set the same for eliminating the possibility of a person being struck by the jaw in case of an accidental release thereof.

A still further object is to provide an instant closing jaw by reducing its travel from an open to a closed position.

A still further object is to construct a trap that is inexpensive to manufacture and efficient in its performance.

These and other objects will herein after be more fully explained, reference being had to the accompanying drawing forming a part of this specification, and in which like characters will apply to like parts in the different views.

Referring to the drawing:

Fig. 1 is a plan view of the trap in a set position.

Fig. 2 is a side view of Fig. 1.

Fig. 3 is a side view of the trap in a closed position, a part of the trigger mechanism shown in section for convenience of illustration.

The invention herein disclosed relates to an animal trap and particularly adaptable for capturing mice and rats.

Said trap consists of a rectangular base 1 of suitable material such as wood, said base being formed into an elongated plate to receive upon its upper side a jaw member 2, U-shaped in form. Extending at right angle from the legs of the U-shaped jaw at their inner ends is a spring-actuated U-shaped portion 3 of lesser length than that of the jaw to function as the jaw actuator. It will be seen that the two U-shaped members 2 and 3 consists of a single piece of sturdy wire formed into a loop, the fulcrum point for the loop being provided by inturned portion 4, a continuation of one leg of the jaw portion, said inturned portion serving as a pivotal shaft for the jaw and its jaw actuator. Said shaft extends in parallelism with the crotch of the jaw and has its free end engaging over the bending point of the loop as indicated by A, while the other end of the shaft extends through an eye B that is made by bending the same on the inner end of the jaw actuator 3 as shown in Fig. 1.

The shaft is pivoted on the base through the medium of a pair of staples 5 that straddle the shaft and enter the wood base as shown in Fig. 2 by dotted lines.

Urging the jaw to its closed position is a torsion spring 6 wound on the shaft, one end of said spring as at C resting upon the base to fix said end, while the other end is fixed as at D to its adjacent leg of the jaw actuator 3 by engaging therebeneath.

The trigger mechanism to retain the trap in a set position consists of a bait plate 7 and a rockable latch 8. The bait plate 7 is positioned beneath the jaw member 2 and is pivotally connected adjacent the fulcrum point for the jaw, said connection for the bait plate consisting of a pair of upturned ears 9 to receive through its lower ends a U-shaped staple 9' as shown in Figs. 2 and 3. Journalled between the upper ends of the upturned ears is a roller 10 that is rotatably mounted on a pin 11 as shown in Fig. 1, said roller engaging beneath the free end of the latch member 8. The latch member is pivotally connected to the base plate by a staple 12 that has its crotch portion extending through the downwardly turned ears 13 at the other end of the latch member, and extending upwardly from the latch adjacent its rockable point is a resilient detent 14 having an outward curvature E to engage the crotch of the jaw actuator and retain the same downward. The other or free end of the latch has a downwardly and outwardly extending tongue 15 which forms with the free end a bifurcation in which the roller will engage and be void of displacement therefrom. The tongue further acts as a stop for the roller when setting the trap for positioning the ears at right angle to the latch 8, whereby as the bait plate is pivoted downwardly the roller will take an arc away from the latch member to release the pressure thereon and permit downward movement of the latch 8, which in turn will displace the detent from the crotch of the jaw actuator thus closing the jaw.

It will be understood that when the bait plate is rocked sufficient to where an acute angle is formed by the ears and latch, the pressure of the latch as created by the jaw actuator will further move the roller to a position as shown in Fig. 3 to release the jaw actuator. Furthermore by the arrangement of a roller no frictional sliding contact is involved and consequently a slight touch of the bait plate will release the jaw by rotation of the roller from the free end of the latch.

To set the trap is accomplished by gripping the base and vertically positioning the same with the bait plate upwardly, and by a sudden thrust on the base laterally will rock the bait plate outwardly to place the roller in the bifurcation to its fullest extent as shown in Fig. 2. With the trigger mechanism in correct setting position, the jaw actuator 3 is pressed downwardly by the thumb to engage the detent. In this instance, the detent being of resilient material will rock inwardly sufficient by a substantial pressure on the jaw actuator to engage the same beneath the curvature of the detent. By the above manipulation, the trap is set ready for operation, and then placed where desired, however it being understood that the trap must be carefully handled to avoid a jar or sudden movement thereof which would set off the trap as a slight pressure on the bait plate will disengage the roller from the latch and permit rocking thereof.

Although in practice I have found the form of my invention illustrated in the accompanying drawing and referred to in the specification to be efficient and practical, yet realizing that conditions concurrent with the adoption of my invention will necessarily vary, I desire to emphasize that various minor changes in details of construction, proportion and arrangement of parts, may be resorted to as lie with the scope of the appended claim.

Having fully described my invention what I claim as new and desire to secure by Letters Patent is:

An animal trap comprising a base plate, a jaw member U-shaped in form and a U-shaped portion extending at right angle from said jaw member serving as jaw actuator, means to pivotably mount the jaw member and jaw actuator at the junction of the U-shaped portions to said base plate, spring means to urge the jaw member into contact with the base plate, a trigger mechanism consisting of a bait plate and a rockable latch, said bait plate being positioned beneath the jaw member when set, a pair of spaced ears extending upwardly from one end of the bait plate, a U-shaped staple extending through the lower end portion of the said ears and being secured to the base plate adjacent the pivotal point of the jaw member, a roller positioned between the upper ends of the ears and a pin extending through the ears and upon which the roller is journalled, said latch member having downwardly turned ears at one of its ends and a resilient upstanding detent having an outward curvature to engage the jaw actuator for retaining the trap set, a staple extending through the downwardly turned ears of the latch member secured to the base plate and being adjacent the detent, the other end of said latch member extending over the pivotal point of the jaw member and above the roller, a downwardly and outwardly extending tongue on the last said end of the latch member to form a bifurcation therewith and in which the roller is retained, a downward movement of the jaw actuator will force it to slide frictionally over the detent to set the roller, wherein the upstanding ears will be positioned at a right angle to the last said end of the latch member for retaining the trap set, but will be released by a slight downward movement of the bait plate permitting the detent to move inwardly for its disengagement from the jaw actuator.

LEWIS I. RICHARDS.

REFERENCES CITED

The following references are of record in the file of this patent:

UNITED STATES PATENTS

| Number | Name | Date |
|---|---|---|
| 1,118,287 | Jones | Nov. 24, 1914 |
| 1,958,856 | Lehn | May 15, 1934 |
| 2,343,589 | Stilson | Mar. 7, 1944 |

FOREIGN PATENTS

| Number | Country | Date |
|---|---|---|
| 495,048 | Germany | Apr. 1, 1930 |